United States Patent
Müller et al.

(10) Patent No.: US 8,038,892 B2
(45) Date of Patent: Oct. 18, 2011

(54) METHOD AND DEVICE FOR STRIP AND FLAT-SHAPING MACHINING SURFACES OF GLASS PANES

(75) Inventors: Christian Müller, Thörishaus (CH); Norbert Schwankhaus, Baesweiler (DE); Friedrich Triebs, Aachen (DE); Udo Gelderie, Würselen (DE)

(73) Assignee: Vetrotech Saint-Gobain (International) AG, Bern (CH)

( * ) Notice: Subject to any disclaimer, the term of this patent is extended or adjusted under 35 U.S.C. 154(b) by 1144 days.

(21) Appl. No.: 11/718,568

(22) PCT Filed: Nov. 14, 2005

(86) PCT No.: PCT/CH2005/000670
§ 371 (c)(1),
(2), (4) Date: Jun. 4, 2007

(87) PCT Pub. No.: WO2006/053455
PCT Pub. Date: May 26, 2006

(65) Prior Publication Data
US 2008/0096469 A1    Apr. 24, 2008

(30) Foreign Application Priority Data

Nov. 19, 2004 (CH) ...................................... 1912/04

(51) Int. Cl.
*C03C 15/00* (2006.01)
(52) U.S. Cl. .................. 216/31; 216/59; 216/67; 216/80
(58) Field of Classification Search .................. None
See application file for complete search history.

(56) References Cited

U.S. PATENT DOCUMENTS

| | | | |
|---|---|---|---|
| 3,604,889 A * | 9/1971 | Rohrberg | 219/121.45 |
| 4,390,772 A * | 6/1983 | Hiratake | 219/121.51 |
| 5,319,186 A * | 6/1994 | Lenhardt | 250/202 |
| 5,837,958 A * | 11/1998 | Fornsel | 219/121.5 |
| 6,855,908 B2 * | 2/2005 | Takeuchi et al. | 219/121.4 |
| 7,510,664 B2 * | 3/2009 | Carr | 216/24 |
| 7,651,585 B2 * | 1/2010 | Yoon et al. | 156/345.43 |
| 7,771,829 B2 * | 8/2010 | Hilmer et al. | 428/425.6 |
| 2002/0179575 A1 * | 12/2002 | Fornsel et al. | 219/121.5 |
| 2004/0026385 A1 * | 2/2004 | Koulik et al. | 219/121.36 |
| 2007/0090092 A1 * | 4/2007 | Forstner et al. | 216/67 |

FOREIGN PATENT DOCUMENTS

EP                709348 A1 *   5/1996

* cited by examiner

*Primary Examiner* — Anita Alanko
(74) *Attorney, Agent, or Firm* — Notaro, Michalos & Zaccaria P.C.

(57) ABSTRACT

The removal of partial areas of a coating (11, 12) on at least one surface (37, 38) of a glass pane (2) takes place by means of a plasma jet (14, 15) which emerges from a plasma nozzle (5, 6). The plasma nozzle (5, 6) is part of a plasma unit and two such plasma units are provided. Both of the plasma nozzles (5, 6) are oriented towards each other and form a pair of nozzles. A glass pane (2) is machined between both of the nozzles (5, 6). A distance sensor (23, 24) is arranged on both of the nozzles (5, 6), and said nozzles (5, 6) are positioned at the correct distance in relation to the surface (37, 38) of the glass pane (2).

8 Claims, 3 Drawing Sheets

METHOD AND DEVICE FOR STRIP AND FLAT-SHAPING MACHINING SURFACES OF GLASS PANES

The invention relates to a method for the strip- and areal-form working, in particular for the partial removal of organic and inorganic coatings on surfaces of glass panes, wherein a glass pane with a surface coating on at least one side is placed into a working and displacement means, a plasma jet is generated with a plasma nozzle and the plasma nozzle is moved over the surface of the glass pane, this plasma jet is directed against the surface region of the glass pane with the coating to be removed and the coating is at least partially removed via the plasma jet. Such invention also relates to a device for carrying out the method with a working and displacement means with a support plane for a broad side of the glass pane and a movement and carrier means for at least one plasma nozzle for the generation of a plasma jet, the plasma nozzle comprising a front face directed toward a broad-side surface of the glass pane with an outlet port for the plasma jet.

Known laminated glasses are comprised of at least two glass panes, which are disposed in parallel and are connected with one another in the margin region by a spacer. In laminated insulation glasses at least one of the glass panes is very frequently provided with a coating on the inwardly directed side. This coating serves in known manner for functional improvement, in that for example heat or light radiation is reflected. In laminated fire protection glasses to some extent the same coatings are utilized as in laminated insulating glasses. For example organic or inorganic layers are used. This coating has, for example, the purpose to permit in the event of fire a good isolation of glass fragments from the fire protection compound. In laminated glasses which are comprised of more than two glass panes, the glass panes which are located in the internal space are in some cases also coated on both sides. The spacers employed in the margin region between the glass panes are comprised of synthetic material or metal profiles or of a strand of elastic spacer material. The profiles are connected with the glass panes by means of a margin connection adhesive or self-adhesive properties. Most frequently the spacer material has self-adhesive properties. In addition to the spacer profiles or the strand of spacer material, frequently also a strand of sealing material in inserted. The known margin connection adhesives and the adhesive spacer material are optimized and laid out for good adhesion on the glass surface. However, they adhere only insufficiently or not at all on the coatings or do not ensure optimal sealing against the internal space due to oxidizing properties of some coatings. Therefore, wherever adhesive compounds, or for other reasons of access to the "clean" glass face, are provided, the coatings must be removed again. Partial removal of the coating can take place in known manner with the aid of a gas flame or through suitable mechanical means, for example with the aid of a grinding disk.

DE C1 3403682 discloses a method and a device which relate to the strip-form removal of coatings on glass panes for laminated insulating glasses. In the case of the glass panes described here, a partially reflecting multilayer of type metal oxide-metal-metal oxide is applied on one side. For the strip-wise removal of the multilayer along the pane margins, a gas burner is coupled with the cutting means, which burns off the coating in the margin region. The strip-wise removal of the coating takes place here simultaneously with the cutting to the desired size of the glass panes. This disposition has the disadvantage that bilaterally coated glass panes, in which on both sides a strip-form region of the coating is to be removed, must be turned by 180°. They must subsequently be guided for a second time through a corresponding installation with a burner in order to remove the coating. This process entails high expenditures and consumes time. Glass panes coated on one side must always be introduced into the decoating means in such a way that the coated glass side is directed toward the device with the gas burner. A portion of the glass panes must consequently be turned before the working with corresponding expenditures. For the subsequent assembly of several glass panes to form a laminated glass, every second glass must again be turned. Burning off the coating can additionally only take place at a limited rate.

A further solution for the partial removal of coatings on glass panes is disclosed in WO-A-0119745. This involves a device for the partial removal of water-repellant coatings on automobile panes. Instead of a gas burner, a plasma burner is proposed for use. Compared to a normal gas flame, a plasma jet has a significantly more precisely defined nozzle cross section and smaller nozzle cross sections can also be defined. This solution also entails the disadvantage that glass panes which are coated on both broad sides must be turned and must be guided twice through the installation if the coating is to be partially removed on both sides. When applying a plasma jet, there is furthermore the problem that the distance between the plasma nozzle and the surface of the glass panes must be maintained relatively precisely. If the distance is too small, the plasma jet can be extinguished or an incomplete result of the decoating process is obtained. If the distance is too great, the decoating is also incomplete and residues of the coating remain. This leads to flaws and to rejections in the production of glass panes with partially removed coating. With this known device no solution is described regarding the manner in which the distance between the plasma nozzle and the surface of the glass pane can be precisely maintained.

The present invention therefore addresses the problem of providing a method and a device with which organic and inorganic coatings on surface of glass panes can be removed in the form of strips and areas, wherein the glass panes do not need to be turned before and after working, the removal of the coating can be carried out on one side only or also successively on both sides or simultaneously on both sides, the removal of the coating can be effected at any desired areal region of a glass pane and simultaneously the maintenance of the optimal distance between each plasma nozzle and the broad side surfaces is ensured.

This problem is solved in a method according to the invention through the characterizing characteristics of the claims and in a device according to the invention. Advantageous further developments of the invention are evident in the characteristics of the dependent patent claims.

In the method according to the invention at least one pair of plasma nozzles is disposed in the region of the glass pane surface which is to be decoated, and the outlet ports for the plasma jet are directed one toward the other and simultaneously each against one of the broad side surfaces of the glass panes opposite one another. The two nozzles of a pair of plasma nozzles are controlled and operated jointly. Optionally, from one of the two nozzles of the nozzle pair one region of a surface or from both nozzles simultaneously two regions of two surfaces are impinged upon by one plasma jet. From the region of the surfaces impinged upon by the plasma jet, the coating is therein removed and simultaneously the glass surface is activated. Through the disposition of at least one pair of plasma nozzles and thereby that the two plasma jets are directed toward one another, the glass pane can be guided between two plasma jets, or the pair of plasma nozzles can be moved on both sides of the glass pane. The two nozzles of a pair of plasma nozzles are controlled and operated jointly and, if needed, one of the two nozzles or both nozzles can be operated simultaneously. If a glass pane is only coated on one side, only that nozzle of a pair is set in operation toward which the coated surface is directed. The glass panes guided through the installation can be coated in any desired manner on the front side or the back side. Depending on the requirement, the nozzle on the front side or the nozzle on the back side is set in operation and the corresponding surface is acted upon by the plasma jet. It is consequently no longer necessary to turn the glass panes before their introduction into the installation such that the coated surface is always directed in the same direction. After the glass panes leave the installation, the partially decoated glass panes no longer need to be turned since they can already be introduced into the installation in the correct position and subsequently be joined directly with other glass panes to form a laminated glass. Glass panes coated on both broad side surfaces can be decoated on both sides in one operating cycle. They consequently also no longer need to be turned and be guided for a second time through the installation. This working method leads to the reduction of working steps since the turning of the glass panes and the repeated pass through the installation becomes superfluous.

An appropriate embodiment of the method provides that the two plasma nozzles of a pair are oriented on a common axis and are disposed on this common axis at a predetermined distance with respect to one another. It is further proposed according to the invention that during the change of position of the glass pane through the installation and/or during the movement of the nozzle pair along the glass pane, variations are detected by means of distance sensors of the position of the broad side surfaces of the glass pane in the region between the plasma nozzles. Depending on these position variations, the pair of plasma nozzles is each displaced at right angles to the glass pane in the direction of the position variations of the glass pane surfaces. This method step permits the simple setting and correcting of the distance between the surfaces of the glass pane and the plasma nozzles. The simultaneous displacement of the two nozzles of a nozzle pair also ensures that the distance of the nozzles to both surfaces of a glass pane is always optimal. Distortions of the glass pane or irregularities on the surface can thereby be compensated, however, to some extent can also discrepancies of the position of a glass pane, if it is not guided optimally through the installation.

In further development of the invention the method provides that the change of position of the pair of plasma nozzles takes place only if the variation of the position of the broadside surfaces of the glass pane exceeds a predetermined displacement value. The predetermined displacement value is determined thereby that the value is formed with respect to a neutral position of the glass pane, from the difference between a maximally permissible working distance between the front face of the plasma nozzle and the pane surface and a minimally permissible working distance between the front face of the plasma nozzle and the pane surface. This approach ensures that at both nozzles, in relationship to both surfaces of a glass pane, the value of the minimal distance is never fallen below and that of the maximal distance is never exceeded. This ensures that the plasma jet is not extinguished and the decoating process simultaneously always proceeds in optimal quality and completeness. The neutral position of the glass pane is that position at which the glass pane is located precisely in the center between the two nozzles. In this position the distance between the particular pane surface and the nozzle is equal on both sides of the glass pane. The clearance interspace between the two nozzles of a pair in this case is determined by the sum of the thickness of the glass pane plus the maximal distance and plus the minimal distance.

In the device according to the invention on each of the sides of a support plane for the glass pane one plasma nozzle each is disposed, wherein the two plasma nozzles form a pair and the front faces of these two nozzles are directed toward one another. At each plasma nozzle a distance sensor is disposed which determines a minimal offset between the front face of the plasma nozzle and the surface of the glass pane. Between the two front faces of the nozzles of a nozzle pair is a clearance distance which corresponds to at least the sum of the thickness of the glass pane plus the two-fold minimal offset of the front face of the plasma nozzle plus a permissible displacement value. This disposition according to the invention entails the advantage that the bilateral working of a glass pane becomes possible without the glass pane needing to be turned. During the working process in which strip-wise a portion of the coating is removed on a surface of the glass pane, optionally one of the two nozzles or simultaneously both nozzles can be set into operation. The distance sensor at each nozzle ensures that a minimal distance between the front faces of the nozzles and the surfaces of the glass pane is not fallen below and a maximal distance is also not exceeded. This is necessary in order to ensure the desired and optimal functions of the plasma jet which streams out at the nozzles. Since both nozzles are directed toward one another, the two distance sensors are also directed toward one another and form on both sides of the glass pane a function unit. The clearance distance between the front faces of the two nozzles of a nozzle pair is so selected that it corresponds at least to the sum of the thickness of the glass pane plus the two-fold minimal offset plus a previously determined permissible displacement value. The permissible displacement value is that measure by which the glass pane can be moved between the two nozzles without the minimal distance being fallen below or the maximal distance being exceeded. This ensures that the plasma jet streaming out from the nozzles is neither extinguished nor too strongly scattered. The permissible displacement value therewith also corresponds to the tolerance range in which the plasma jet exhibits its optimal effect. If the glass pane is located in a neutral position, i.e. precisely in the center between the two nozzles, the distance between the front face of each nozzle and the surface of the glass pane corresponds to the sum of the minimal offset and one half of the permissible displacement value.

It is further proposed according to the invention that the distance sensor is a mechanical spacer which extends from the front face of the plasma nozzle in the direction toward the surface of the glass pane. In a neutral position of the glass pane between the two nozzles, the front end of the spacer directed toward the surface of the glass pane has a clearance distance. This clearance distance corresponds at least to one half of the permissible displacement value of the glass pane. The length of the mechanical spacer consequently corresponds to the minimally permissible distance between the front face of the plasma nozzle and the pane surface. However, the length of the mechanical spacer can also be greater should this appear to be appropriate for maintaining the quality of the working.

In an appropriate embodiment of the invention, the permissible displacement value is determined by the difference of the maximally permissible working distance between the front face of the plasma nozzle and the pane surface and the minimally permissible working distance between the front face of the plasma nozzle and the pane surface. This displacement value, by which the glass pane between the nozzles may become displaced in permissible manner, ensures that the nozzles of a nozzle pair are not displaced with the smallest variation, but rather only when the discrepancies would impair the quality and the operational function of the working.

According to the invention it is further proposed that the plasma nozzle includes a rotation head and the plasma jet streams out at the front face of the rotation head eccentrically with respect to the rotational axis and rotates about this axis. Such plasma nozzles are known per se. In connection with the solutions according to the invention they offer the advantage that the spacer can be disposed approximately in the center of the front face of the plasma nozzle and in the proximity of the axis of rotation. This leads to considerable constructional advantages and permits the disposition of the spacers in different embodiment forms. Especially advantageous was found to be a solution in which the spacer is comprised of a duroplastic synthetic element with a sliding face at the front end. Suitable materials for such a synthetic element are materials from the group of phenolic plastics, for example a rod of a phenolic resin-bonded paper. Such a spacer prevents damage of the glass surface at a contact with the spacer. It is therefore possible to bearing-support the nozzles of a nozzle pair such that at a contact of the spacer with the pane surface they are displaced by the spacer at approximately right angles to the pane surface. This solution is very simple and yet leads to very high operating reliability.

A further implementation of the invention provides that the distance sensor is a contact-free sensor, this contact-free sensor being connected with a control apparatus. The control apparatus cooperates with a setting arrangement, which acts onto the plasma nozzle pair. In this embodiment contact-less sensors known per se, for example an optical sensor, are employed. The disposition even when using a contact-less sensor has the same clearance distance between the nozzles of a nozzle pair and the same permissible displacement value as has already been described above. The sensor detects therein potential variations of the positions of the glass surfaces of a glass pane and outputs corresponding measurement and control signals to the succeeding control apparatus and the setting arrangement for the nozzles. These have the effect that the minimal distance is not fallen below and the maximal distance between the front faces of the plasma nozzles and the pane surfaces is not exceeded.

In the following the invention will be explained in conjunction with embodiment examples with reference to the attached drawing. Therein depict:

Figure 1:
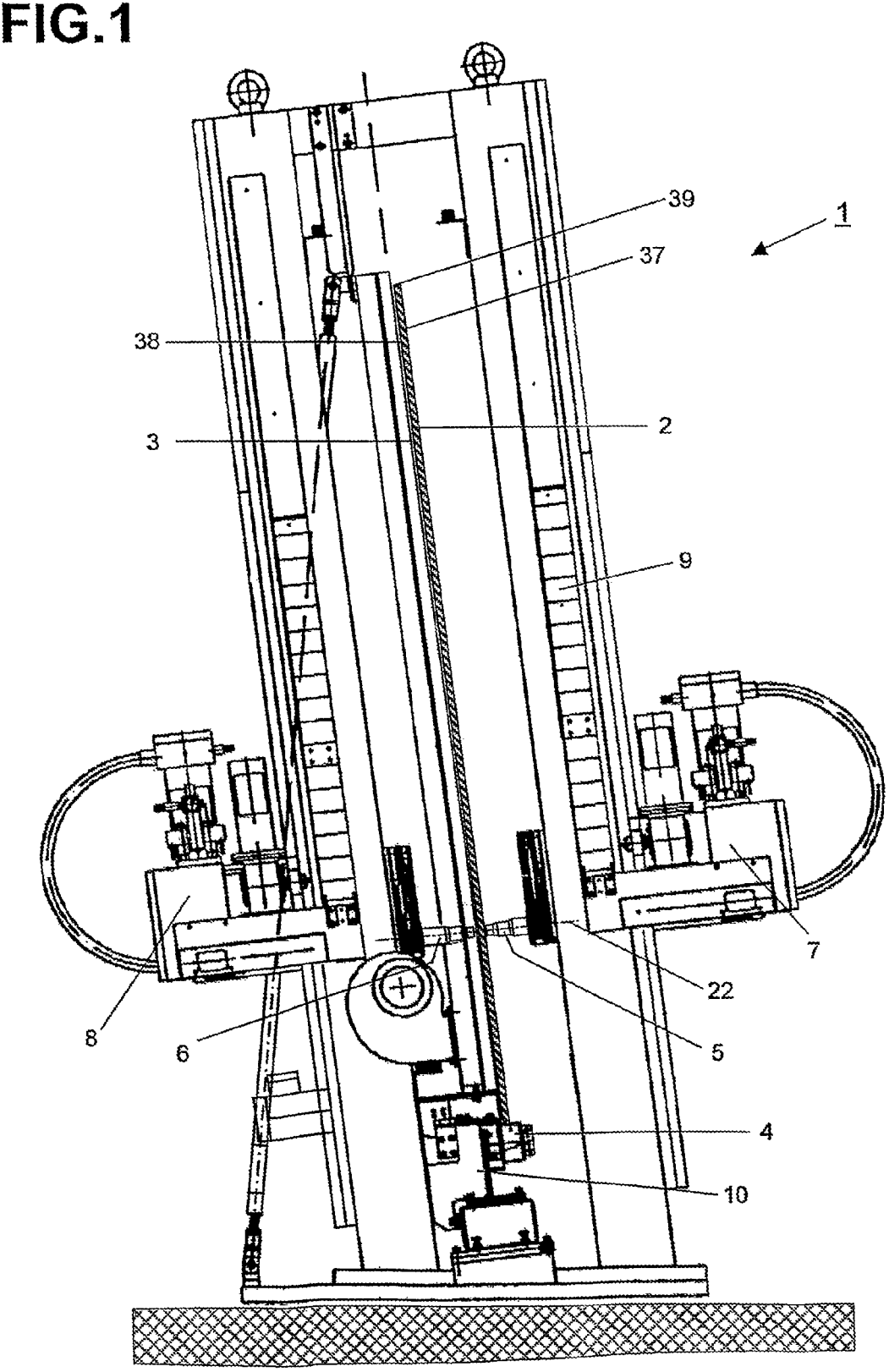
FIG. 1 depicts a working facility for decoating surfaces.

FIG. 1 shows a decoating facility 1, which is a part of a laminated glass production line. Such laminated glass production lines are built as horizontal production lines and may comprise, for example, a means for pretreatment of glass panes 2, the depicted decoating facility 1, a means for applying spacers as well as an assembly means for joining several glass panes to form a laminated glass unit. The decoating facility 1 comprises a support plane 3 on which a glass pane 2 rests and is held in known manner. At the lower region of the support plane 3 is disposed a rest and transport belt 4 on which bears the glass pane 2. By means of this transport belt 4 and a transport drive 10 the glass pane 2 is conveyed in the horizontal direction through the decoating facility 1. On an axis 22 extending at approximately right angles to the glass pane 2 a pair of plasma nozzles 5, 6 is disposed. These plasma nozzles 5, 6 are each a part of one unit 7 and 8, respectively, which are equipped with the necessary means for generating a plasma. The decoating facility 1 comprises further a carrier mechanism 9, which extends approximately in the vertical direction of the decoating facility 1 and parallel to the support plane 3. The plasma units 7, 8 are movable along this carrier mechanism 9 and therewith are also the two plasma nozzles 5, 6. The two plasma nozzles 5, 6 of the nozzle pair are directed toward one another and have a free interspace through which the glass pane 2 is guided. A plasma jet streaming out from the plasma nozzle 5 is directed against a front surface 37 of the glass pane 2. A plasma jet streaming out from plasma nozzle 6 is directed against a rear surface 38 of the glass pane 2. It is thereby possible to act and work either only on the surface 37 of glass pane 2 or only on surface 38, or on both surfaces 37 and 38 simultaneously with a plasma jet. Working in the horizontal direction takes place thereby that the glass pane 2 by means of transport belt 4 is moved in the horizontal direction through the decoating facility 1 past the plasma nozzles 5, 6. Working in the vertical direction takes place thereby that the plasma nozzles 5, 6 move or travel with the aid of plasma units 7, 8 and the vertical carrier mechanism 9 approximately in the vertical direction and therein the working of one or both surfaces 37, 38 of glass pane 2 through the plasma jets is carried out. In the present example the depicted decoating facility 1 is specifically implemented for working the edge regions 39 of glass panes 2, which are coated on the broad side surfaces 37,38 on one or both sides. These coatings may be such as are utilized in known manner in glass panes for laminated insulating glass or in glass panes for laminated fire protection glass. With the facility according to the invention such coatings can be removed stripwise, in particular along the edge regions 39. However, with the commensurate control of the vertical and horizontal drives any desired lines on the surfaces 37, 38 of glass pane 2 can be traversed and stripwise decoated. In the case of assembled glass panes 2, i.e. already cut to size, the facility serves in particular for decoating the edge regions 39. Thereby spacer profiles of synthetic material or metal can be adhered onto the glass pane 2 or a strand of spacer material can be extruded onto the edge regions. In the case of glass panes 2 which must still be divided, the corresponding regions along which the pane will be parted can be stripwise decoated with the facility according to the invention. The plasma jet permits therein a very high quality in the removal of coatings and also a high working rate. The ionized gas of the plasma jet simultaneously improves in known manner the adhesion for the adhesive agent on the surfaces of glass pane 2 by activating the glass surfaces.

Figure 2:
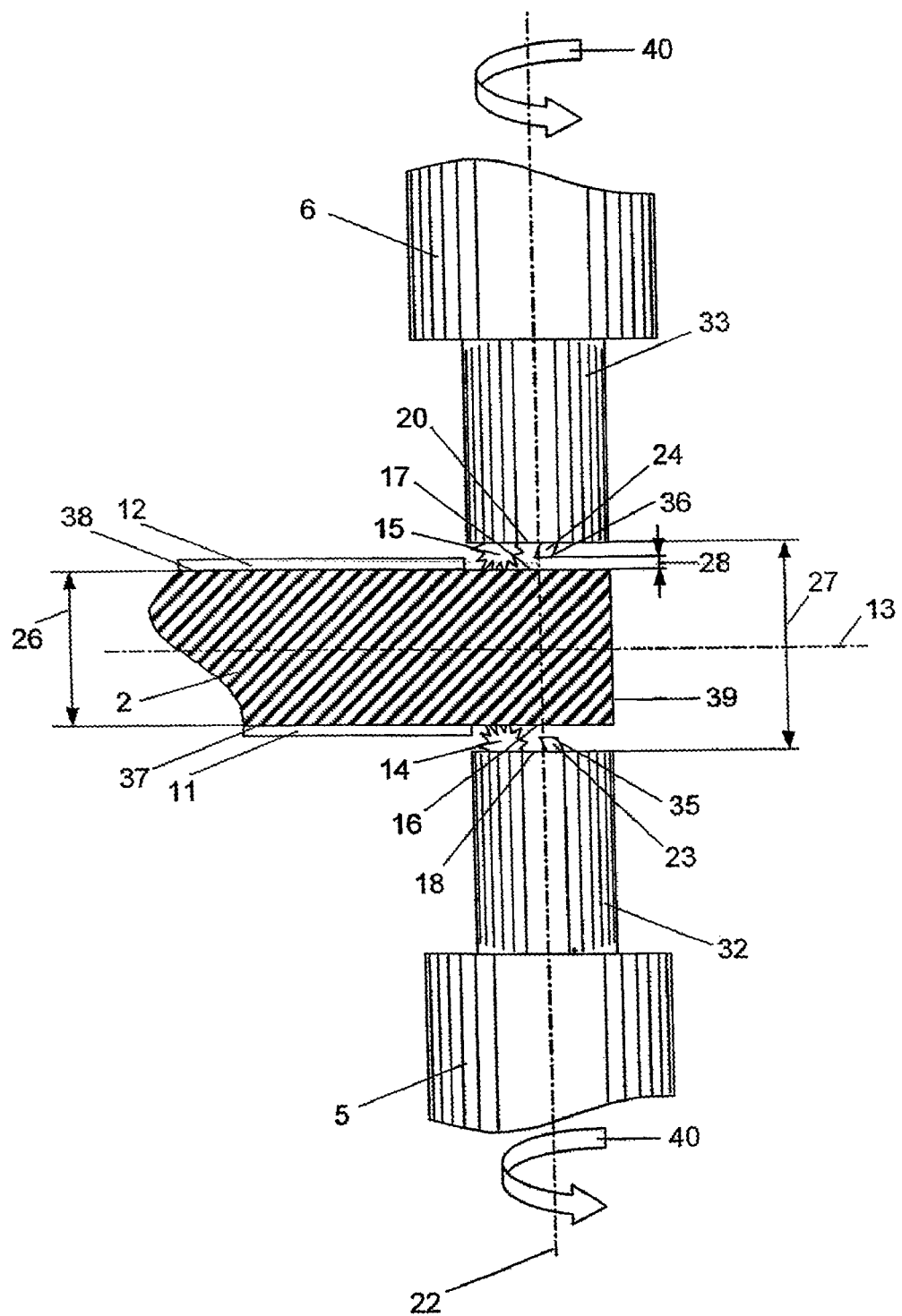
FIG. 2 depicts a segment from the edge region of a glass pane and a pair of plasma nozzles.

FIG. 2 shows a partial segment of a vertical edge region 39 of a glass pane 2, which is provided on both surfaces 37, 38 with a coating 11, 12. The described example involves a glass pane 2 intended for use in a laminated fire protection glass. This laminated glass is comprised of three glass panes, the glass pane 2 being disposed in the middle. In the finished laminated glass, between this middle glass pane 2 and each of the two outer glass panes is disposed a layer of a fire protection compound known per se. The two coatings 11, 12 are a so-called primer, in the described example they are inorganic layers. At the edge region 39 of glass pane 2 the coating 11, 12 must be removed along strip-form margin regions 16, 17 of surfaces 37, 38. For this purpose on an axis 22 extending approximately at right angles to the glass pane 2 a pair of plasma nozzles 5, 6 is disposed. These two plasma nozzles 5, 6 are, as described in connection with FIG. 1, parts of plasma units 7, 8. The two plasma nozzles 5 and 6 are directed toward one another. The front faces 18, 20 of the two plasma nozzles 5, 6 are positioned at a distance 27 from one another in the direction of axis 22. The distance 27 defines a clearance interspace between the two nozzles 5, 6 in which the glass pane 2 is located. When the glass pane 2 is located precisely in the middle between the two front faces 18, 20, this is referred to as the neutral position defined by axis 13. From the two front faces 18 and 20 of the two plasma nozzles 5 and 6, respectively, stream out the plasma jets 14 and 15, respectively. In the described example two plasma jets 14, 15 are available with which the glass pane 2 can be simultaneously decoated on both sides. The two plasma nozzles 5, 6 include nozzle heads 32, 33, which rotate about axis 22 in the direction of arrow 40. This nozzle structure permits applying a concentrated, precisely defined plasma jet 14, 15. Since these plasma jets 14, 15 stream out eccentrically with respect to the rotational axis 22 from the nozzle heads 32, 33, with the aid of the rotational movement of the nozzle heads 32, 33 nevertheless a relatively broad region of the surfaces of the glass pane 2 can be acted upon. The width of the margin regions 16, 17 on surfaces 37, 38, which are to be decoated, can be varied in that the assembly axis or rotational axis 22 of the two nozzles 5, 6 is displaced with respect to the edge 39 of glass pane 2.

At the front faces 18 and 20, respectively, of the two plasma nozzles distance sensors in the form of mechanical spacers 23 and 24 are disposed. These spacers 23, 24 include at their ends directed toward the surfaces 37, 38 of glass pane 2 sliding faces 35 and 36. In the neutral position of the glass pane 2 on axis 13 each of these sliding faces 35, 36 of distance sensors 23 and 24 has a distance 28 to the surfaces 37, 38 of the glass pane 2. If the glass pane 2 moves out of the neutral position, it can shift forward as well as also backward by a predetermined displacement value. This predetermined displacement value 31 (see FIG. 3) corresponds overall to the two-fold value of distance 28. This predetermined displacement value 31 corresponds to the tolerance range in which the plasma jets have the desired working quality and cannot be extinguished. As soon as one of the surfaces 37, 38 of glass pane 2 contacts a sliding face 35 of the two distance sensors 23, 24 and continues to move further in this direction, the two plasma jets 5, 6 are displaced together as a pair in the direction of the discrepancy with respect to axis 13. In order to make this possible, the two plasma jets 5, 6 are commensurately bearing-supported such that they are freely movable and/or are guided such that with corresponding regulation drives they track the movements of the surfaces 37, 38 of glass pane 2. The mechanical spacers 23, 24 depicted in FIG. 2 represent an especially simple solution since no sensitive optical or electronic sensors are necessary. Even if only one of the two plasma nozzles 5 and 6, respectively, is set in operation and consequently only one of the two surfaces 37, 38 of glass pane 2 is worked and decoated, the distance of the active plasma nozzle 5 and 6 to the glass surface 37 and 38, respectively, is controlled together with the opposing nozzle or its spacer. This is ensured thereby that before the beginning of the working of a glass pane 2 in the working facility 1 the distance 27 between the front faces 18 and 20 of the two plasma nozzles 5, 6 is set to the correct dimension. As is evident in FIG. 3, this distance 27 is determined thereby that the sum is formed of the thickness 26 of glass pane 2, plus the two-fold minimal offset 29 of the front face of the plasma nozzle from the glass surface and plus the permissible displacement value 31. The permissible displacement value 31 (see FIG. 3) is thereby predetermined in that the difference is formed between a maximally permissible working distance 30 between the front faces 18 and 20 of the plasma nozzles 5 and 6, respectively, and the pane surfaces 37 and 38, as well as a minimally permissible working distance 29 between the front faces 18 or 20 of the plasma nozzles 5 and 6, respectively, and the pane surfaces 37 and 38, respectively. The maximally permissible working distance 30 is therein the maximal length of the plasma jet 14 or 15, at which this plasma jet 14 or 15 still operates optimally and is coherent. The minimally permissible working distance 29 is here the minimal length of the plasma jet 14 or 15, at which this plasma jet 14 or 15 still burns and is not extinguished.

Figure 3:
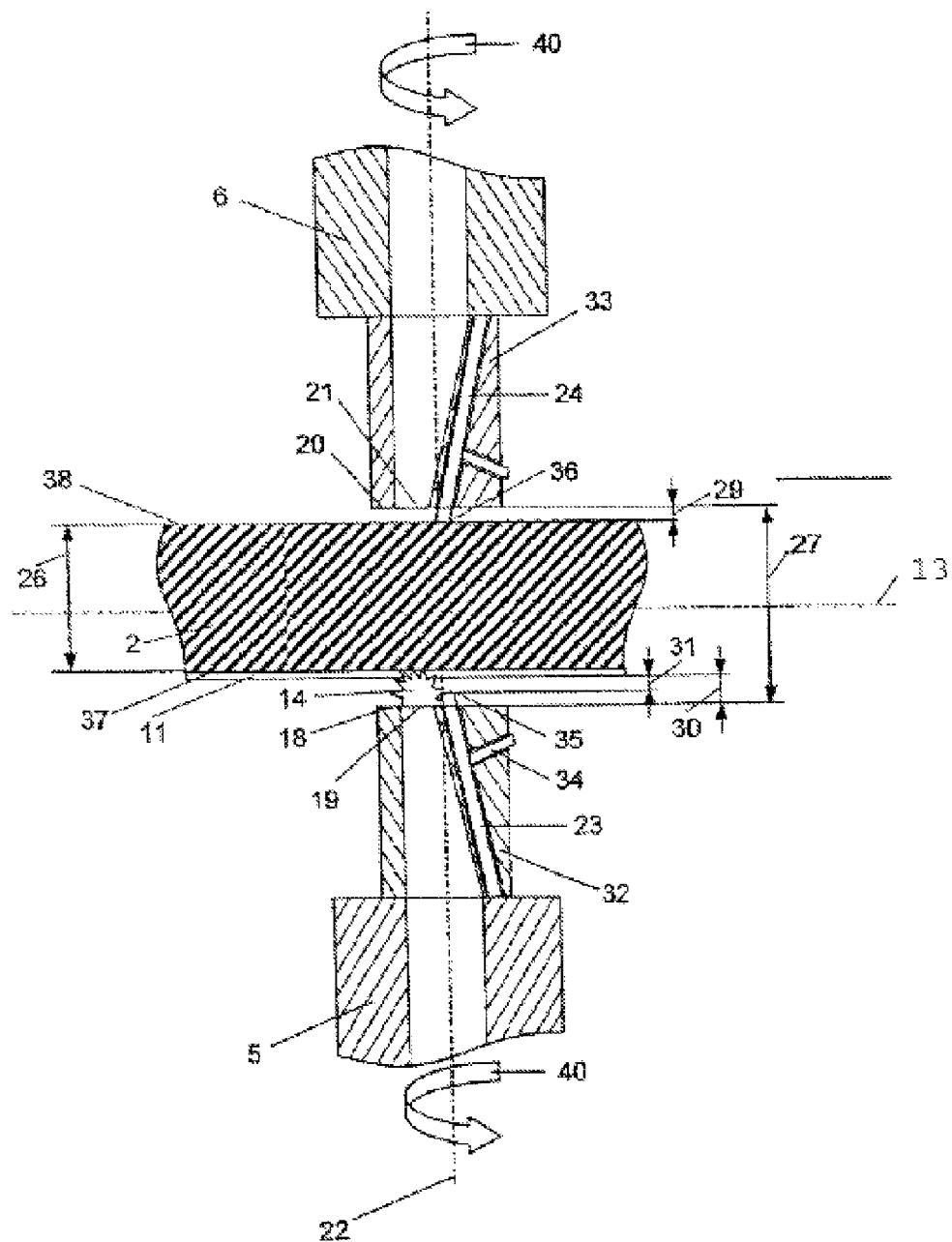
FIG. 3 depicts a pair of plasma nozzles in partial section.

FIG. 3 depicts also a partial segment from an edge region 39 of a glass pane 2, however, of a horizontal edge region 39. The partial regions of the plasma nozzles 5, 6 which are visible are shown sectioned. The glass pane 2 depicted in FIG. 3 is only coated on one side with a coating 11, and specifically on surface 37. For that reason also only the plasma nozzle 5 is active and generates a plasma jet 14 for working or decoating a partial region of surface 37 of glass pane 2. If a glass pane 2 were coated on the opposite surface 38, plasma nozzle 6 would alternatively be set into operation and surface 38 be acted upon in a partial region with a corresponding plasma jet 15 depicted in FIG. 2. In this representation it is evident that the outlet ports 19, 21 for the plasma jets 14, 15 are disposed eccentrically with respect to the rotational axis 22. Since the nozzle heads 32, 33 of the two plasma nozzles 5, 6 rotate about the rotational axis 22 in the direction of arrow 40, a relatively broad strip on the surfaces 37, 38 of glass pane 2 is nevertheless acted upon. In the rotation heads 32, 33 of both plasma nozzles 5, 6 the mechanical spacers 23, 24 are installed. These spacers 23,24 in the depicted example are comprised of a round rod of phenolic resin-bonded paper. However, they may also be produced of another suitable material, in particular from the group of phenolic plastics. The spacers 23, 24 are positioned with the aid of fastening elements 34 and held in the nozzle heads 32, 33. The sliding faces 35 and 36 of the two spacers 23 and 24, respectively, project beyond the front faces 18 and 20, respectively, of the two plasma nozzles 5, 6. The distance between the front ends 35, 36 and the front faces 18, 20 of both nozzles 5, 6 is therein at least as large as the minimally necessary working distance 29, which is necessary for the correct function of the plasma jets 14, 15. FIG. 3 shows the glass pane 2 in a position in which it is deflected from the neutral position in accordance with axis 13. The surface 38 lies therein at the front end or the corresponding sliding face 36 on spacer 24. The opposite surface 37 of the glass pane in this position has the maximally permissible working distance 30 to the front face 18 of plasma nozzle 5. Between the surface 37 of glass pane 2 and the front end 35 of spacer 23 at the plasma nozzle 5 is formed the predetermined permissible displacement value 31. When the glass pane 2 moves further in the direction of plasma nozzle 6, the plasma nozzle 6 is also displaced into this direction and therewith also the opposing plasma nozzle 5. This common movement is stringently predetermined, since the two plasma nozzles 5, 6 form a pair and are jointly controlled and displaced. However, if the glass pane 2 moves in the direction of plasma nozzle 5, the pair of plasma nozzles 5, 6 remains in the depicted position until the surface 37 of glass pane 2 makes contact with the front end 35 of the spacer 23. With a further displacement of the glass pane 2 in this direction the nozzle pair 5, 6 is again jointly displaced into this counterdirection. Through this operational method according to the invention and the corresponding device variations of the positions of surfaces 37 and 38 of glass pane 2 and also position variations of the glass pane 2 itself can be compensated and there is always the simultaneous assurance that the minimal working distance for the plasma jets 14, 15 is not fallen below and the maximal working distance for the plasma jets 14, 15 is not exceeded. Moreover, as already described, it is possible to work alternatively partial regions of the surface 37 of the glass pane 2 or of the surface 38 of glass pane 2 or both surfaces 37 and 38 of glass pane 2 simultaneously.

The invention claimed is:

1. A method for treating glass surfaces in strips or areas, comprising the steps of
providing a glass pane comprising two opposite broad side surfaces, the glass pane being at least partially coated with a coating;
placing the glass pane in a working and displacement facility;
arranging at least one pair of plasma nozzles so that the outlet openings for a plasma jet are directed toward one another and simultaneously toward one of the opposite broad side surfaces of the glass pane;
moving the pair of plasma nozzles and the surface of the glass pane relative to one another;
generating a plasma jet by at least one plasma nozzle of the pair of plasma nozzles directing the plasma jet toward the coated surface region of the glass plane, thereby at least partially removing the coating by means of the plasma jet and activating the glass surface;
detecting, during the movement of the glass pane and of the nozzle pair relative to one another, variations of the position of the broad side surfaces of the glass pane in the region between the plasma nozzles, the pair of plasma nozzles each being displaced at approximately right angles to the glass pane in the direction of the position variation of the glass pane surfaces;
wherein the two nozzles of the pair of plasma nozzles are controlled and operated jointly, so that the plasma jet is generated optionally from one of the two nozzles of the nozzle pair or from both nozzles simultaneously.

2. The method of claim 1, wherein a displacement of the pair of plasma nozzles relative to said glass pane only takes place if the variation of a position of the broad side surfaces of the glass pane relative to the nozzle outlets exceeds a predetermined permissible displacement value.

3. The method of claim 2, wherein, the predetermined permissible displacement value of the position of the glass pane is determined from a difference between a maximally permissible working distance between a front face of the respective plasma nozzle and the pane surface and a minimally permissible working distance between the front face of the plasma nozzle and the pane surface.

4. A method for treating glass surfaces in strips or areas, comprising the steps of
providing a glass pane comprising two opposite broad side surfaces, the glass pane being at least partially coated with a coating;
placing the glass pane in a working and displacement facility;
arranging at least one pair of plasma nozzles so that the outlet openings for a plasma jet are directed toward one another and simultaneously toward one of the opposite broad side surfaces of the glass pane;
moving the pair of plasma nozzles and the surface of the glass pane relative to one another;
generating a plasma jet by at least one plasma nozzle of the pair of plasma nozzles directing the plasma jet toward the coated surface region of the glass plane, thereby at least partially removing the coating by means of the plasma jet and activating the glass surface;
wherein the two nozzles of the pair of plasma nozzles are controlled and operated jointly, so that the plasma jet is generated optionally from one of the two nozzles of the nozzle pair or from both nozzles simultaneously; and
wherein the step of moving the pair of plasma nozzles and the surface of the glass pane relative to one another comprises rotating each plasma nozzle around a rotation axis, the outlet openings being displaced with respect to the rotation axis.

5. The method according to claim 4, wherein the step of moving the pair of plasma nozzles and the surface of the glass pane relative to one another further comprises conveying the glass pane between the pair of rotating plasma nozzles.

6. The method according to claim 4, further comprising determining a minimal offset between the front face of each plasma nozzle and the surface of the glass pane by a distance sensor.

7. The method according to claim 6, wherein the distance sensor is located in a proximity of the rotational axis.

8. The method of claim 1, wherein the two plasma nozzles of the pair are oriented on a common axis and are disposed at a selected distance with respect to one another on the common axis.

* * * * *